Figure 1:
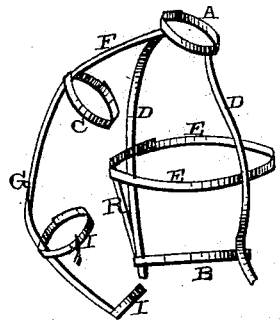

(No Model.) 2 Sheets—Sheet 1.

D. C. HAMILTON.
DRESS MAKER'S MEASURE.

No. 276,032. Patented Apr. 17, 1883.

Witnesses.
Louis F. Gardner
E. D. York

Inventor.
D. C. Hamilton,
per
R. B. Chamberlin,
Atty (No Model.) 2 Sheets—Sheet 2.
D. C. HAMILTON.
DRESS MAKER'S MEASURE.
No. 276,032. Patented Apr. 17, 1883.
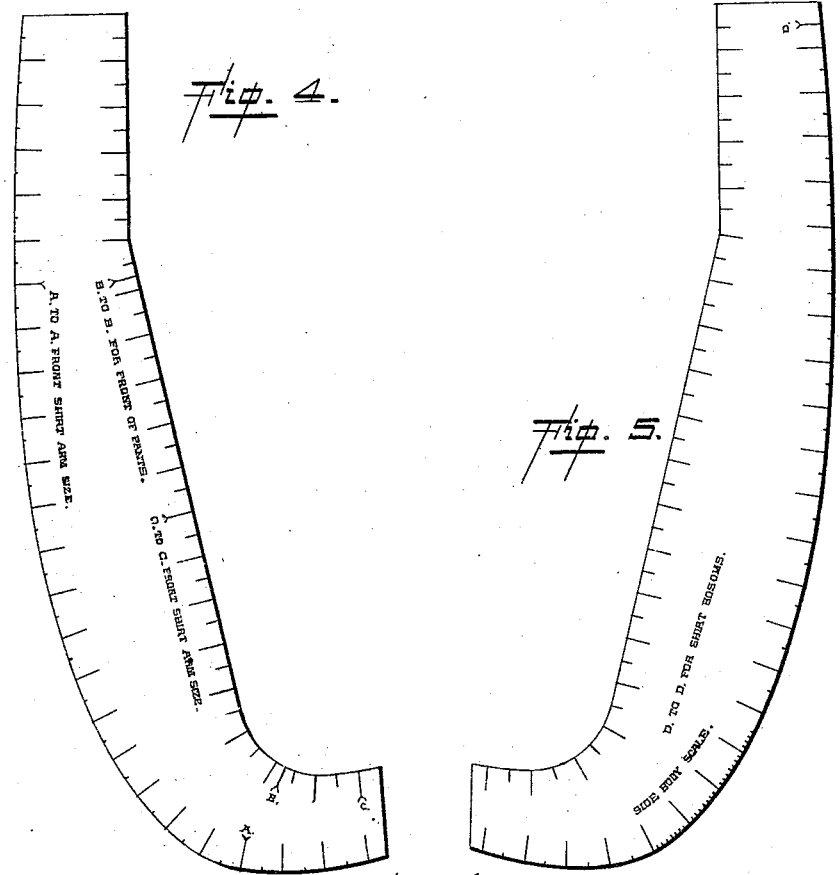
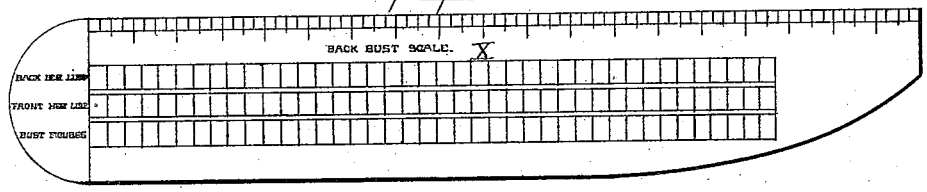
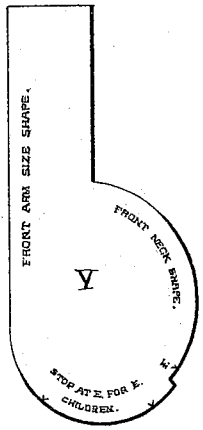
Witnesses.
Louis F. Gardner
E. D. York
Inventor.
D. C. Hamilton,
per
R. B. Chamberlin
Atty

UNITED STATES PATENT OFFICE.

DOCIA C. HAMILTON, OF NEW YORK, N. Y.

DRESS-MAKER'S MEASURE.

SPECIFICATION forming part of Letters Patent No. 276,032, dated April 17, 1883.

Application filed December 21, 1882. (No model.)

*To all whom it may concern:*

Be it known that I, DOCIA C. HAMILTON, a citizen of the United States, residing at New York city, in the county of New York and State of New York, have invented certain new and useful Improvements in Dress-Makers' Measures, of which the following is a specification, reference being had therein to the accompanying drawings.

My invention relates to an improvement in dress-makers' measures; and it consists in a rule which is made in two parts, one of the parts being provided with a semicircular slot and the other with a projection or stop to catch therein, and both parts provided with suitable holes, through which a screw is passed for the purpose of locking the two parts at the desired angle to each other.

A represents a suitable spring, made of thin steel, and having a scale marked upon one or both of its ends, which are made to overlap, so as to be adjustable to necks of different sizes. Around the waist is passed a second similar spring, B, which is also provided with scales upon its ends, which are made to overlap, so as to adjust the spring to different-sized persons. Around the upper portion of the arms, at the shoulder, is passed another spring, C, which is similarly constructed, and which is also made adjustable to different-sized arms. From the spring A to the spring B extends the tape D, which may be connected directly to the spring B, or passed inside of it, and which then extends down the front of the person for the purpose of giving the length of the skirt. This tape will be provided with scales, and will give the measure of the front of the dress from the spring A to the spring B. Passed around the body is another tape, E, which may there be loosely connected to the tape D, or which may be entirely independent thereof, and which is used in taking the bust-measure. From the spring A to the spring C extends the tape F, which is used in taking the shoulder-measure. Another tape, G, is used, which may be either an entirely separate one or form an extension of the tape F, and which tape G is made to extend along down the arm for taking the arm-measure. This tape will be held in position upon the arm by means of any suitable bands, I. From the tape E, used in taking the bust-measure, down to the spring B around the waist, extends the tape R, which is used for taking the measure under the arm. A suitable tape or tapes also extend down the back from the spring A, and are used in taking the back-measure. Each one of the tapes above described is provided with regular scales, and each one will be provided with suitable adjustable fastenings, for the purpose of attaching them either to each other or to the body. By means of the construction above described a system of measurements can be given which enables the operator to secure an exact measurement of all parts of garments by a single adjustment of the springs and tapes.

In connection with the above-described springs and tapes, which are used only in taking measures, I use a two-foot rule or measure, 1, which has pivoted upon one end a shorter rule, 2, which has a foot-scale marked upon it. Secured to the inner pivoted end of the foot-rule is a stud or projection, 3, which passes through the circular slot 4, which is made through the rule 1. This slot, in connection with the projection, serves to limit the movement of the foot-rule, so that when it is swung around it will form a right angle with the main rule; also marked upon the rule 1 is a line, 9, which indicates forty-five degrees, and in order to hold the shorter rule exactly at this point, a hole, 5, is made through both of the rules, through which a set-screw is passed. This set-screw clamps and holds the two rules rigidly in position, so that there is no danger of their becoming displaced at any time. A suitable hole, 7, is also made through rule 1, so that when the rule 2 is turned at a right angle its hole 5 will register with the one 7, and then when a set-screw is passed through these two holes 5 7 the two parts will be locked together at a right angle. It will be seen that this rule is adapted for running straight lines and for marking any angles at which the shorter rule may be turned.

In connection with the rule above described and the springs and tapes, there will also be used the pattern Y, for cutting the front neck shape, and the front arm-size shape of dresses, and the pattern X, which will be provided with suitable scales for measuring the back hem-line, front hem-line, and the bust-figures.

Figure 2:
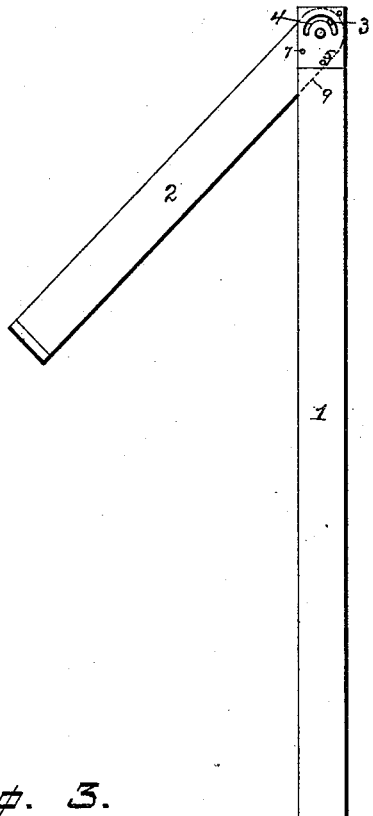
Figure 3:
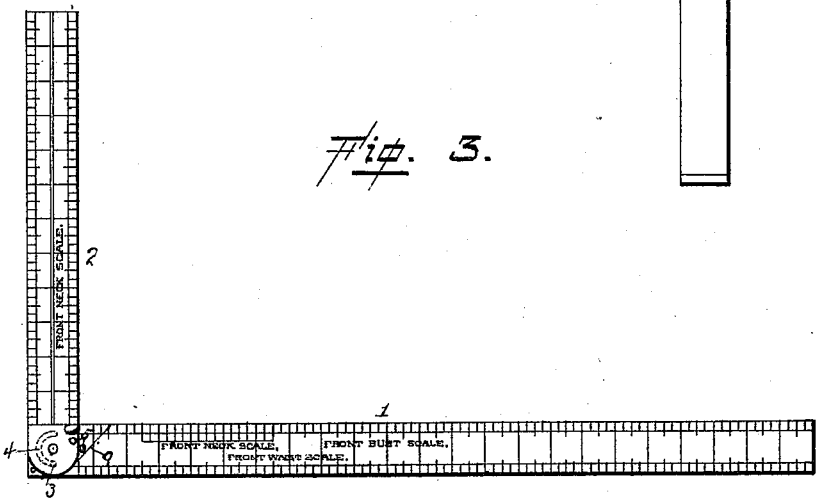

In the accompanying drawings, which represent my invention, Figure 1 is a perspective of the springs and tapes applied to a lady's form. Figs. 2 and 3 are views of the rule or measure. Figs. 4, 5, 6, 7 are views of the charts by which the different parts of the dress are laid out.

Having thus described my invention, I claim—

A measure for dress-makers, composed of the two parts, 1 2, one of which is provided with a semicircular slot, 4, and the other with a projection, 3, so that the two parts can be set at a right angle to each other on either side, and provided with the holes 5 7, whereby they may be locked together by means of a set-screw at different angles, substantially as shown.

In testimony whereof I affix my signature in presence of two witnesses.

DOCIA C. HAMILTON.

Witnesses:
R. B. CHAMBERLIN,
J. C. SKIDMORE.